Aug. 14, 1962     C. E. BROWNING     3,048,995
PELT FLESHING MACHINE

Filed July 25, 1961     3 Sheets-Sheet 1

Clarence E. Browning
INVENTOR.

BY *Clarence A. O'Brien*
*and Harvey B. Jacobson*
Attorneys

Aug. 14, 1962   C. E. BROWNING   3,048,995
PELT FLESHING MACHINE
Filed July 25, 1961   3 Sheets-Sheet 2
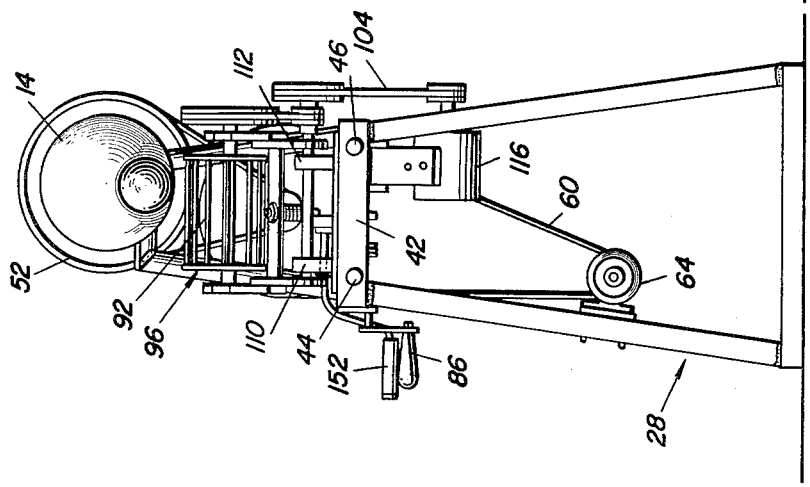
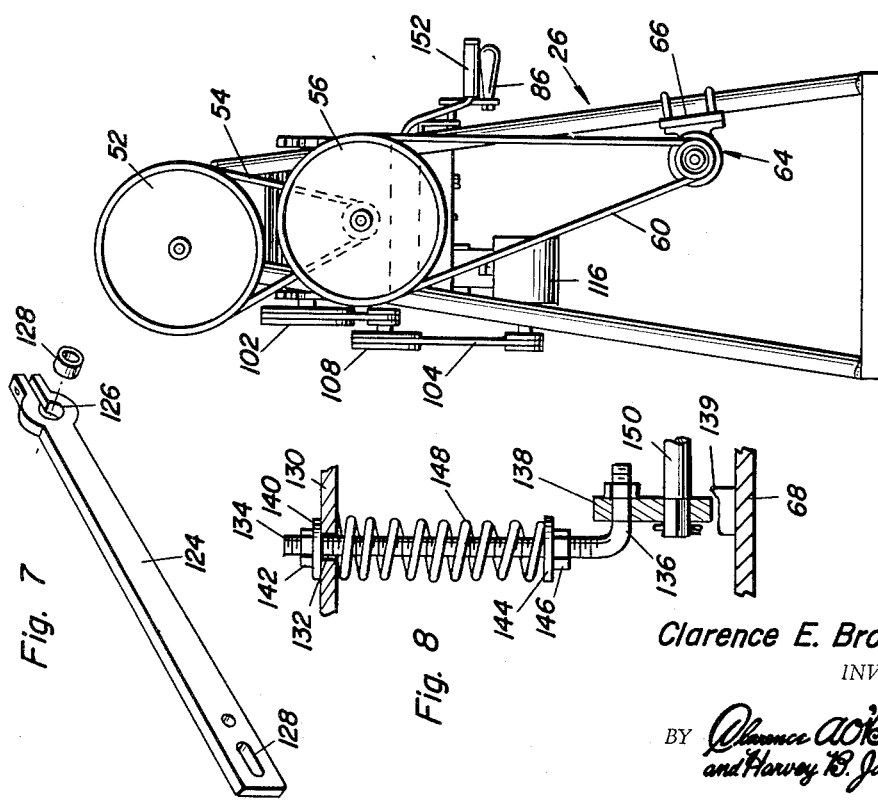
Clarence E. Browning
INVENTOR.

Aug. 14, 1962  C. E. BROWNING  3,048,995
PELT FLESHING MACHINE
Filed July 25, 1961  3 Sheets-Sheet 3
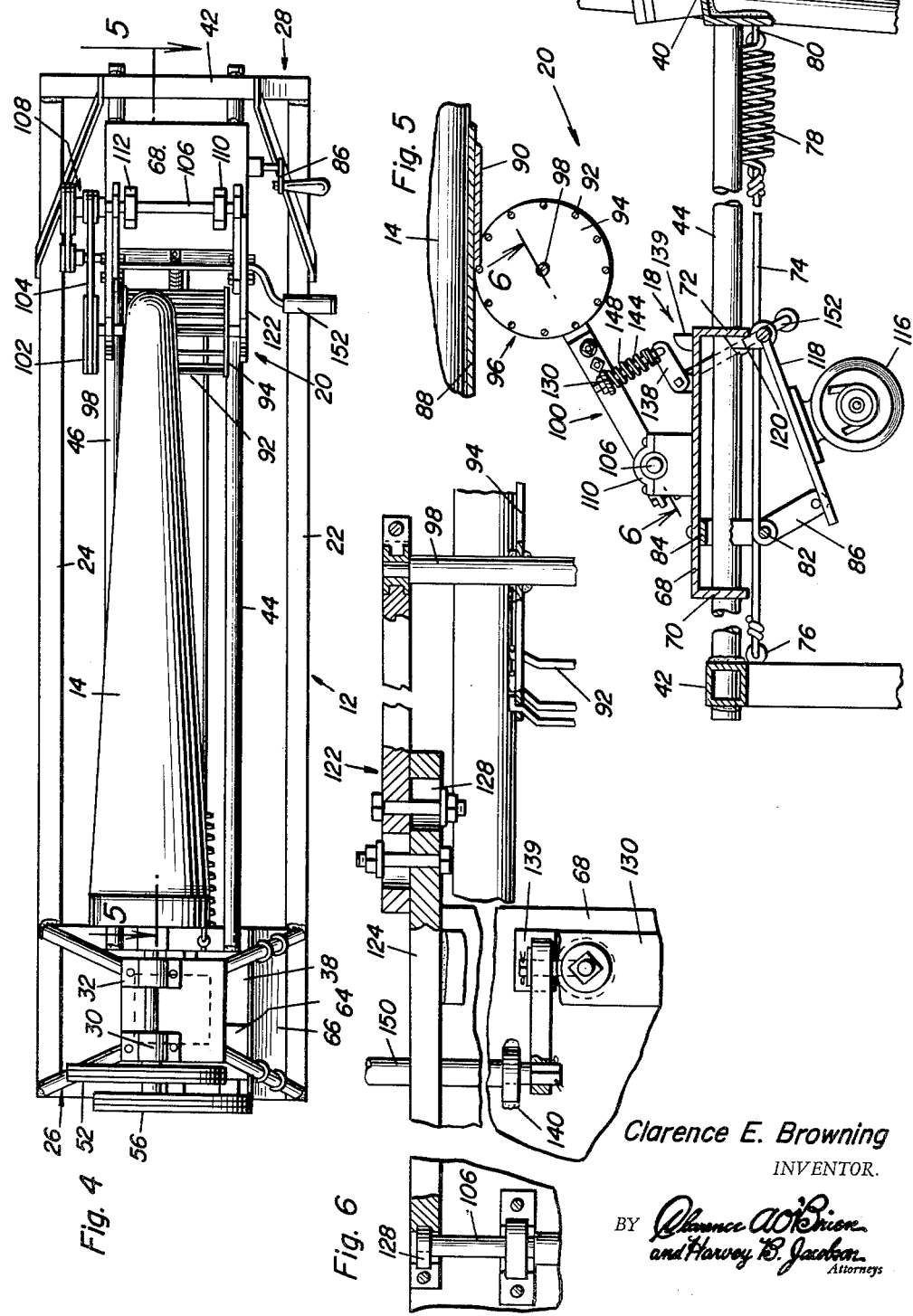
Clarence E. Browning
INVENTOR.

United States Patent Office 3,048,995
Patented Aug. 14, 1962

3,048,995
PELT FLESHING MACHINE
Clarence E. Browning, 209 E. Colonial Drive,
Hanford, Calif.
Filed July 25, 1961, Ser. No. 126,694
14 Claims. (Cl. 69—46)

This invention relates to a new and useful machine for removing excess flesh from the hide of fur-bearing animals from which the pelts have been taken.

After the pelts of fur-bearing animals have been removed by the pelterer, a considerably difficult task remains in removing excess flesh from the hide of the pelts before the pelt may be further processed or treated so that it may be used in the manufacture of fur garments. Excess flesh from the pelts has heretofore been removed by scraping with hand tools which has proved time consuming and costly and unless performed by experienced hands often results in damage to the skin portion of the pelt within which the fur hairs are rooted. Machines heretofore designed for the purpose of replacing skilled and experienced labor and for removing the excess flesh more rapidly, have not proven to be satisfactory in view of the lack of uniformity in the size, thickness and quality of pelts. Machines incapable of accommodating the varying dimensional requirements in fleshing the pelts have therefore caused damage to many pelts. It is therefore a primary object of the present invention to provide a pelt fleshing machine which overcomes all of the defects noted with respect to machines heretofore used, by more rapidly and uniformly fleshing fur-bearing pelts without damage thereto.

Another object of the present invention is to provide a pelt fleshing machine in which no knife blades or sharp edges are used in order to scrape the excess flesh from the pelt.

A further object of this invention is to provide a pelt fleshing machine in which the excess flesh is rolled off in one piece making the flesh collecting and removal process easier to cope with.

A still further object of this invention is to provide a pelt fleshing machine which is not affected as far as its operational efficiency is concerned by the quantity of excess flesh remaining on a pelt. Accordingly, the pelterer in removing the pelt from fur-bearing animals may do so with less exacting requirements and is hence less likely to damage the pelt when removing it.

An additional object of this invention is to provide a pelt fleshing machine capable of applying a controlled variable pressure by a novel rotating scraper assembly for engaging the excess flesh and rolling it off the hide of the pelt mounted on a conical pelt holder, in response to rotation of the conical holder. The excess flesh is rolled off the pelt thereby the removal being accomplished without disturbing or damaging the membranes of the oil containing skin layer of the hide in which the fur hairs are rooted. A more rapid yet careful removal of the excess flesh from the pelts may thereby be realized.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a rear elevational view of the pelt fleshing machine.

FIGURE 3 is a front elevational view of the pelt fleshing machine.

FIGURE 4 is a top plan view of the pelt fleshing machine.

FIGURE 5 is a partial sectional view taken substantially through a plane indicated by section line 5—5 in FIGURE 4.

FIGURE 6 is a partial sectional view taken substantially through a plane indicated by section line 6—6 in FIGURE 5.

FIGURE 7 is a perspective view of a section of the scraper mounting assembly.

FIGURE 8 is a partial sectional view taken through a plane indicated by section line 8—8 in FIGURE 1.

Figure 1:
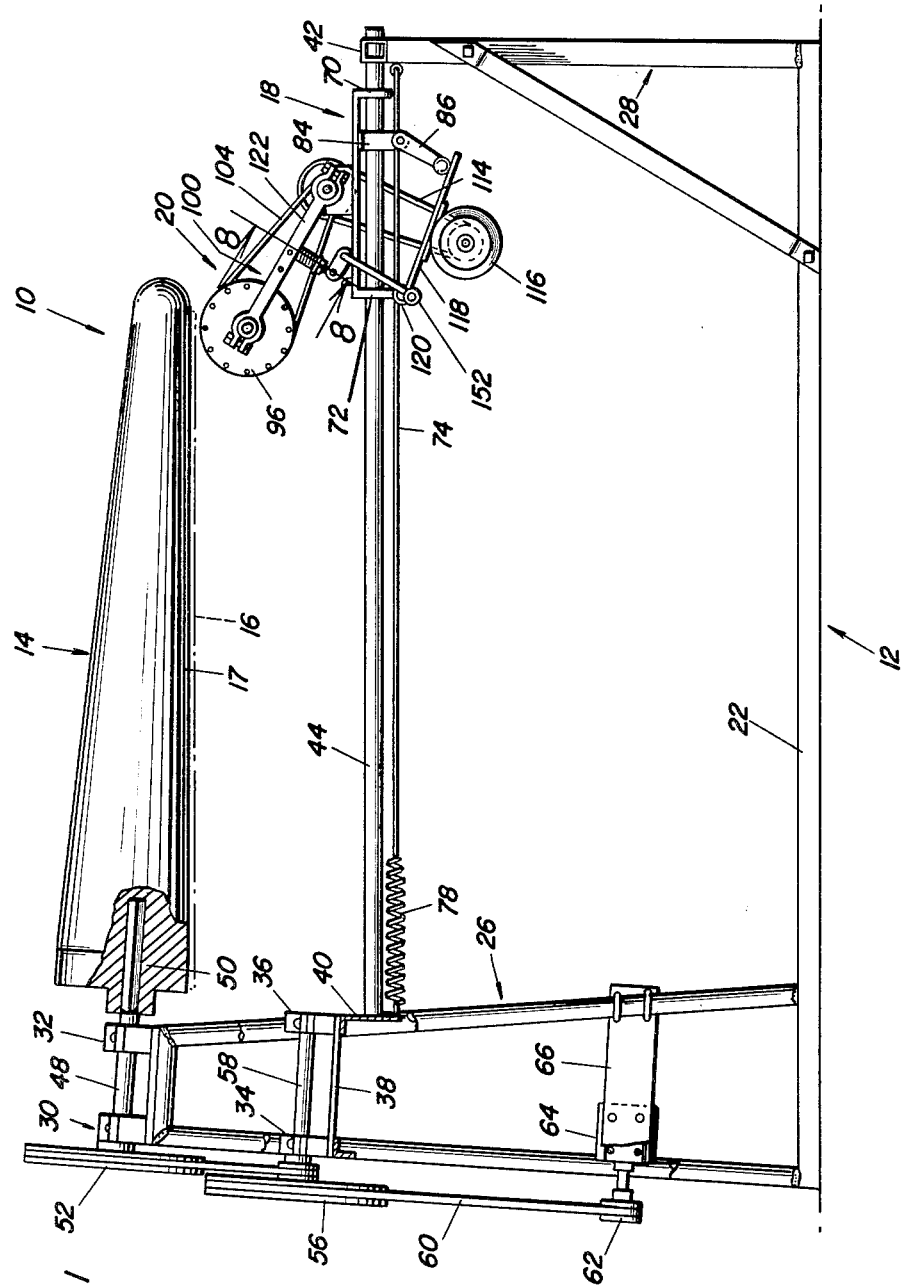
FIGURE 1 is a side elevational view with parts shown in section of the pelt fleshing machine of the present invention.

Referring now to the drawings in detail, it will be observed in FIGURE 1, that the pelt fleshing machine is generally referred to by reference numeral 10. The machine 10 is supported by means of a frame assembly generally referred to by reference numeral 12. Rotatably mounted by the frame assembly 12 is a rotatable pelt holding member 14 which is conical in shape in order to receive the pelt of the fur-bearing animal for which the machine 10 is designed. It will therefore be appreciated that the actual shape of the pelt holding member 14 may depend upon the type of animal pelt placed thereon. However, the pelt holding member 14 is rotatably mounted about an axis which is slightly inclined from a horizontal and also slightly offset from the longitudinal geometric or conical axis of the holder so that the undersurface of the holder 14 will always be substantially parallel to movement of a carriage assembly 18 that is slidably mounted by the frame assembly 12. The undersurface of the holder will therefore vibrate between a lower position 16 and an upper position 17 as shown by dotted and solid lines respectively in FIGURE 1, as the holder is rotated. The carriage assembly 18 on the other hand mounts a scraper assembly generally referred to by reference numeral 20 that engages the pelt for removal of the excess flesh therefrom as the carriage 18 is moved with respect to the rotating holder 14. The pelt after removal from the animal is therefore placed upon the holder member 14 with the fur on the inside exposing the flesh to be removed. The pelt is circumferentially arranged on the holder so that the thinner portion of the pelt such as the belly is presented at the upper underside position 17 while the heavier back portion is presented at the lower underside position 16. Also, the head portion of the pelt is positioned over the smaller diameter end of the holder 14 while the rump portion is disposed over the larger diameter end.

The frame assembly 12 which may be of any suitable design, as illustrated is composed of a pair of parallel base members 22 and 24 as more clearly seen in FIGURE 4. A mounting frame portion 26 interconnects the base members 22 and 24 at the rear end of the machine and extends upwardly thereabove. At the forward end of the frame assembly 12 there is mounted frame portion 28 which also extends upwardly from the base but below the upper end of the rear frame portion 26. The upper ends of the rear portion 26 of the frame, mounts a pair of bearing assemblies 30 and 32 for rotatably supporting the holder member 14. A second pair of bearing support assemblies 34 and 36 are mounted in spaced relation below the upper end of the frame portion 26 by means of the supporting plate member 38. Connected to the supporting plate member 38, is a transverse frame member 40. The frame member 40 is aligned with a transverse frame member 42 at the upper end of the forward frame portion 28, for the purpose of mounting therebetween a pair of guide rails 44 and 46.

The conical pelt holding member 14 is rotatably supported on the frame portion 26 in its horizontal position by means of a drive shaft 48 offset with respect thereto which is journalled in the bearing assemblies 30 and 32.

The drive shaft 48 has a square portion 50 by means of which it is keyed to the holder member 14 for rotation thereof. Connected to the other end of the drive shaft 48 is a pulley wheel 52. The pulley wheel 52 is drive connected by belt 54 to the compound pulley wheel 56 mounted on one end of the intermediate shaft 58 journalled in the bearing assemblies 34 and 36. The pulley assembly 56 is belt connected by belt 60 to the drive pulley 62 connected to the output shaft of any suitable power source such as electric motor 64 secured to one leg of the frame portion 26 by a mounting plate 66 as more clearly seen in FIGURES 1 and 2. Accordingly, rotation may be imparted to the pelt holder 14.

The carriage 18 includes an upper mounting plate portion 68 and as more clearly seen in FIGURE 5, and further includes downwardly depending portions 70 and 72 which are slidingly mounted on the guide rails 44 and 46 so that the carriage assembly 18 may be slidably moved along the frame assembly. The rails 44 and 46 are therefore disposed parallel to the undersurface 16 of the pelt holder member 14. In order to controllably move the carriage assembly 18 along the rails, a cable member 74 is anchored at one end by the eye member 76 to the forward frame portion 28 while at the other end the cable is connected to the spring member 78 which in turn is anchored by the hook 80 to the plate member 40 on the frame portion 26. The cable 74 is wound about the shaft member 82 rotatably mounted by a downwardly depending member 84 suitably secured to the carriage assembly 18. Connected to the shaft member 82 is the handcrank member 86. It will therefore be apparent, that the hand crank member 86 may be rotated in either direction in order to wind or unwind the cable 74 upon the shaft 82 and thereby propel the carriage assembly 18 in either direction along the guide rails 44 and 46.

The flesh scraping assembly 20 is mounted on the carriage assembly 18 and hence movable therewith along the guide rails for engagement with the flesh on the pelt mounted on the holder 14. As shown therefore in FIGURE 5, the holder member 14 mounts the pelt 88 from which the excess flesh 90 is being removed by the flesh scraping wire elements 92 that engage the flesh for removal thereof in response to rotation of the pelt 88 with the holder 14. The flesh removing wire elements 92 are mounted between plate members 94 in spaced circumferential relation to each other to form a flesh scraping rotor assembly 96. Connected to the plate members 94 of the rotor assembly, is a drive shaft member 98 rotatably mounted at the upper end of a scraper mounting assembly generally referred to by reference numeral 100. A pulley wheel 102 is connected to one end of the drive shaft 98 and is belt connected by belt 104 to a shaft member 106 through a compound pulley wheel assembly 108. The shaft 106 is rotatably mounted between a pair of journal blocks 110 and 112 mounted on the top portion 68 of the carriage assembly 18. The compound pulley wheel assembly 108 is in turn belt connected by belt 114 to the output pulley of an electric motor 116 that is mounted on a supporting plate member 118 pivotally mounted by pivot bracket 120 at the lower end of the depending portion 72 of the carriage assembly 18. Accordingly, the weight of the electric motor 116 will tension the drive belt 114 in order to impart rotation therethrough to the pulley wheel assembly 108 and through the belt 104 to the flesh scraping rotor 96. The drive for the rotor 96 will be provided regardless of the angular position of the mounting assembly 100 on which the rotor 96 is mounted in view of the pivotal mounting of the mounting assembly 100 about the shaft 106 to which the pulley assembly 108 is connected.

The mounting assembly 100 includes a pair of adjustable lever arm members 122, each of which is composed of a pair of sections 124 as more clearly seen in FIGURES 6 and 7. Each section has formed at one end thereof a journal formation 126 receiving a journal bushing 128 for rotatably mounting the section either on the shaft 106 or for rotatably supporting the rotor shaft 98. The other end of each section 124 includes a slot 128 for adjustably connecting the section 124 to the other section of the lever arm 122. A connecting plate member 130 interconnects the sections of the lever arm 122 which are mounted on the shaft 106 in order to form a rigid mounting arm assembly. An aperture 132 as more clearly seen in FIGURE 8, is formed in the connecting plate member 130, which aperture 132 receives therethrough a threaded rod member 134. The threaded rod member includes a lower right angle portion 136 which is connected to a lever support member 138 pivotally mounted by pivot bracket members 140 suitably secured as by welding to the supporting plate member 68 of the carriage 18. A washer 142 engages the upper side of the connecting plate member 130 and is adjustably positioned on the threaded rod member 134 by the nut member 142. A second thrust washer 144 is held in adjusted postion on the rod member 134 by the nut member 146 to adjust the engaging pressure of assembly 20 to prevent damage to the belly portion of the pelt. A spring element 148 is therefore disposed about the rod member 134 and reacts between the lower thrust washer 144 and the underside of the connecting plate member 130. Accordingly, pivotal displacement of the supporting lever member 138 in a counterclockwise direction as viewed in FIGURE 5, would transmit a displacing force through the spring 148 to the mounting assembly 100 tending to pivotally displace it about the shaft 106 in an upward direction in order to bring the wire elements 92 of the rotor 96 into engagement with the flesh of the pelt on the holder member 14 downward movement being limited by stop 139 engaging the lever member 138. The wire scraping members 92 when in yieldable engagement with the flesh and capable of being displaced downwardly by the vibrating underside of the holder 14 against the bias of the spring 148 in order to engage the pelt with a variable pressure commensurate with the thickness thereof. It will however be appreciated, that the lever support member 138 is normally in a position in which the mounting assembly 100 does not bring the scraping rotor 96 into contact with the pelts. In order to engage the rotor assembly 96 with the pelts, the lever support member 138 is connected to an actuating control shaft 150 to which a control crank handle member 152 is connected.

From the foregoing description, operation and utility of the pelt fleshing machine of the present invention will be apparent. It will therefore be appreciated, that once the pelt has been mounted on the holder member 14, it will only be necessary for the operator through the control crank handle 152 to bring the wire scraping rotor 96 into yieldable contact with the pelt and then by cranking of the handle 86 propel the carriage with the scraping rotor along the underside 16 of the holder 14. The motors 64 and 116 are energized so that the scraping wire elements 92 on the rotor 96 may intermittently engage the excess flesh and gradually roll it from the hide in response to rotation of the hide by the holder member 14 in a direction substantially perpendicular to the direction of movement of the scraping wires 92. As a result thereof, the flesh is removed in one piece from the pelt as the carriage 18 is moved therealong. The removal of the flesh is also thereby accomplished without damage to the layer of skin in which the fur hairs are rooted. The variable pressure engagement of the scraping wires with the flesh by virtue of the spring element 148 and offset of the holder 14 and the use of wires rather than knife blades or sharp edges permit the flesh to be removed without damage to the pelt. The removal of the flesh in one piece on the other hand is accomplished by the rotation of the pelt holder member 14 and the movement of the rotating scraping rotor 96 parallel to the undersurface 16 by propelling the carriage 18. Collection and removal of the excess flesh is thereby facilitated and the fleshing operation is capable of being performed by a single man more rapidly and with less likelihood of damage to the pelt. Furthermore, since the flesh is rolled off the pelt rather than scraped by a knife blade, the pelterer need not be too concerned with removing substantially all of the flesh when pelting the animal. The present invention is therefore particularly desirable to all concerned with the removal and preparation of fur-bearing pelts.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pelt fleshing apparatus comprising, frame means, pelt holder means movably mounted by the frame means, and flesh scraper means movably mounted on the frame means in relation to the holder means and yieldably biased toward said holder means for uniform removal of excess flesh from a pelt carried on the holder means by engagement of the pelt with a variable pressure commensurate with the thickness thereof in response to movement of the holder means and scraper means, said pelt holder means comprising an elongated holder member rotatably mounted in offset relation to a geometrical axis through the holder member and power means operatively connected to the holder member for imparting rotational movement thereto.

2. The combination of claim 1, wherein said flesh scraper means comprises, rotor means, flesh engaging wire means mounted on the rotor means, mounting means movably mounted on the frame means for rotatably mounting the rotor means about an axis substantially perpendicular to an undersurface of the holder means, and selectively operable control means operatively connected to the mounting means for yieldable displacement thereof in a direction to effect flesh engagement by the wire means.

3. The combination of claim 2, including drive means drivingly connected to the flesh scraper means for imparting movement thereto in a direction substantially perpendicular to movement of the holder means for rolling off excess flesh from a pelt thereon.

4. The combination of claim 3, including carriage means movably mounted on the frame means in a direction substantially parallel to the holder means, said scraper means being mounted on the frame means by the carriage means for movement therewith with respect to the holder means.

5. The combination of claim 4, wherein said drive means comprises, motor means mounted on the carriage means and self-tensioning belt means drivingly connecting the motor means to the rotor means.

6. The combination of claim 5, wherein said selectively operable control means comprises, lever support means pivotally mounted on the carriage means, spring means connected to the lever support means and the rotor mounting means and handle means connected to the lever support means for pivotally displacing the lever support means to elevate the mounting means through the spring means.

7. A pelt fleshing apparatus comprising, frame means, pelt holder means movably mounted by the frame means, and flesh scraper means movably mounted on the frame means in relation to the holder means and yieldably biased toward said holder means for uniform removal of excess flesh from a pelt carried on the holder means by engagement of the pelt with a variable pressure commensurate with the thickness thereof in response to movement of the holder means and scraper means, and drive means drivingly connected to the flesh scraper means for imparting movement thereto in a direction substantially perpendicular to movement of the holder means for rolling off excess flesh from a pelt thereon.

8. A pelt fleshing apparatus comprising, frame means, pelt holder means movably mounted by the frame means, and flesh scraper means movably mounted on the frame means in relation to the holder means and yieldably biased toward said holder means for uniform removal of excess flesh from a pelt carried on the holder means by engagement of the pelt with a variable pressure commensurate with the thickness thereof in response to movement of the holder means and scraper means, and carriage means movably mounted on the frame means in a direction substantially parallel to the holder means, said scraper means being mounted on the frame means by the carriage means for movement therewith with respect to the holder means.

9. The combination of claim 8, including drive means drivingly connected to the flesh scraper means for imparting movement thereto in a direction substantially perpendicular to movement of the holder means for rolling off excess flesh from a pelt thereon.

10. The combination of claim 9, wherein said drive means comprises, motor means mounted on the carriage means and self-tensioning belt means drivingly connecting the motor means to the scraper means.

11. A pelt fleshing apparatus comprising, frame means, pelt holder means movably mounted by the frame means, and flesh scraper means movably mounted on the frame means in relation to the holder means and yieldably biased toward said holder means for uniform removal of excess flesh from a pelt carried on the holder means by engagement of the pelt with a variable pressure commensurate with the thickness thereof in response to movement of the holder means and scraper means, said flesh scraper means comprising, rotor means, flesh engaging wire means mounted on the rotor means, mounting means movably mounted on the frame means for rotatably mounting the rotor means and selectively operable control means operatively connected to the mounting means for yieldable displacement thereof in a direction to effect flesh engagement by the wire means.

12. The combination of claim 11 wherein said selectively operable control means comprises, lever support means pivotally mounted on the carriage means, spring means connected to the lever support means and the rotor mounting means and handle means connected to the lever support means for pivotally displacing the lever support means to elevate the mounting means through the spring means.

13. A pelt fleshing apparatus comprising, frame means, pelt holder means movable mounted by the frame means, and flesh scraper means yieldably biased toward said holder means for uniform removal of excess flesh from a pelt carried on the holder means in response to movement of the holder means, said pelt holder means comprising an elongated cone member rotatably mounted in offset relation to a conical axis and power means operatively connected to the cone member for imparting rotational movement thereto, and carriage means supporting said scraper means and movably mounted on the frame means for movement in a direction substantially parallel to an undersurface of the cone member.

14. A pelt fleshing machine comprising, a frame, a pelt holding cone member rotatably mounted by the frame in a substantially horizontal position, power means drivingly connected to the cone member for rotation thereof, a carriage slidably mounted by the frame for movement in parallel spaced relation to the cone member, a scraper mounting assembly pivotally mounted on the carriage, yieldable support means displaceably mounted on the carriage and connected to the mounting assembly, selectively operable handle means connected to the support means for displacement of the support means and mounting assembly, a scraper rotor rotatably mounted by the mounting assembly, circumferentially spaced wire scraping means carried by the scraper rotor for flesh engagement when displaced toward the cone member by the mounting assembly and motor means mounted on the carriage and drivingly connected to the rotor for rotation thereof about an axis substantially perpendicular to the cone member.

References Cited in the file of this patent

UNITED STATES PATENTS

| | | |
|---|---|---|
| 2,847,845 | Frank et al. | Aug. 19, 1958 |
| 2,896,438 | Larsson | July 28, 1959 |
| 2,910,856 | Fredrickson | Nov. 3, 1959 |
| 2,941,391 | Henfling | June 21, 1960 |
| 2,942,448 | Jonas | June 28, 1960 |